(12) United States Patent
McMillian

(10) Patent No.: US 11,029,543 B2
(45) Date of Patent: Jun. 8, 2021

(54) EYEGLASSES AND METHOD FOR IMPROVING EYESIGHT

(71) Applicant: Saundra A. McMillian, District Heights, MD (US)

(72) Inventor: Saundra A. McMillian, District Heights, MD (US)

(*) Notice: Subject to any disclaimer, the term of this patent is extended or adjusted under 35 U.S.C. 154(b) by 0 days.

(21) Appl. No.: 16/830,262

(22) Filed: Mar. 25, 2020

(65) Prior Publication Data
US 2020/0393703 A1 Dec. 17, 2020

Related U.S. Application Data

(63) Continuation-in-part of application No. 15/389,447, filed on Dec. 23, 2016, now abandoned.

(51) Int. Cl.
| | |
|---|---|
| G02C 7/16 | (2006.01) |
| G02C 7/02 | (2006.01) |
| G02C 5/00 | (2006.01) |

(52) U.S. Cl.
CPC .............. *G02C 7/16* (2013.01); *G02C 7/021* (2013.01); *G02C 7/024* (2013.01); *G02C 5/008* (2013.01)

(58) Field of Classification Search
CPC .......... G02C 7/16; G02C 7/165; G02C 7/021; G02C 7/022; G02C 7/024; G02C 7/049
See application file for complete search history.

(56) References Cited

U.S. PATENT DOCUMENTS

| | | | |
|---|---|---|---|
| 1,959,915 A | 5/1934 | Guthrie | |
| 4,955,709 A * | 9/1990 | Smith | G02C 7/16 |
| | | | 351/44 |
| 5,485,227 A | 1/1996 | Lin | |
| 5,825,452 A * | 10/1998 | Spector | A61F 9/02 |
| | | | 351/46 |
| 7,784,934 B2 | 8/2010 | Gauger | |
| 7,857,448 B2 | 12/2010 | Huang | |
| 7,914,144 B2 | 3/2011 | Shuster | |
| 7,976,577 B2 * | 7/2011 | Silvestrini | G02C 7/02 |
| | | | 623/5.13 |
| D668,698 S | 10/2012 | Faber et al. | |
| D668,705 S | 10/2012 | Faber et al. | |
| D669,925 S | 10/2012 | Faber et al. | |
| D672,797 S | 12/2012 | Faber et al. | |
| D675,665 S | 2/2013 | Faber et al. | |
| D680,154 S | 4/2013 | Faber et al. | |
| 2008/0273164 A1 * | 11/2008 | Shuster | G02C 7/165 |
| | | | 351/158 |
| 2009/0147216 A1 * | 6/2009 | Huang | G02C 7/165 |
| | | | 351/159.52 |
| 2018/0224672 A1 * | 8/2018 | Wu | G02C 7/108 |

* cited by examiner

*Primary Examiner* — Jordan M Schwartz
(74) *Attorney, Agent, or Firm* — Hoang Steve Ngo

(57) ABSTRACT

One embodiment of an aspect of the present invention is a pair of eyeglasses having at least one lens with a plurality of holes for natural improvement of eyesight or vision. The holes may be of different sizes and shapes and may be randomly positioned throughout the lens, and the lens may be painted upon. Another embodiment of this aspect is a pair of eyeglasses that has at least one lens with a plurality of holes and that also has a patch. Another aspect of the present invention is a method for natural improvement of eyesight or vision through the use of the eyeglasses of the present invention.

22 Claims, 28 Drawing Sheets

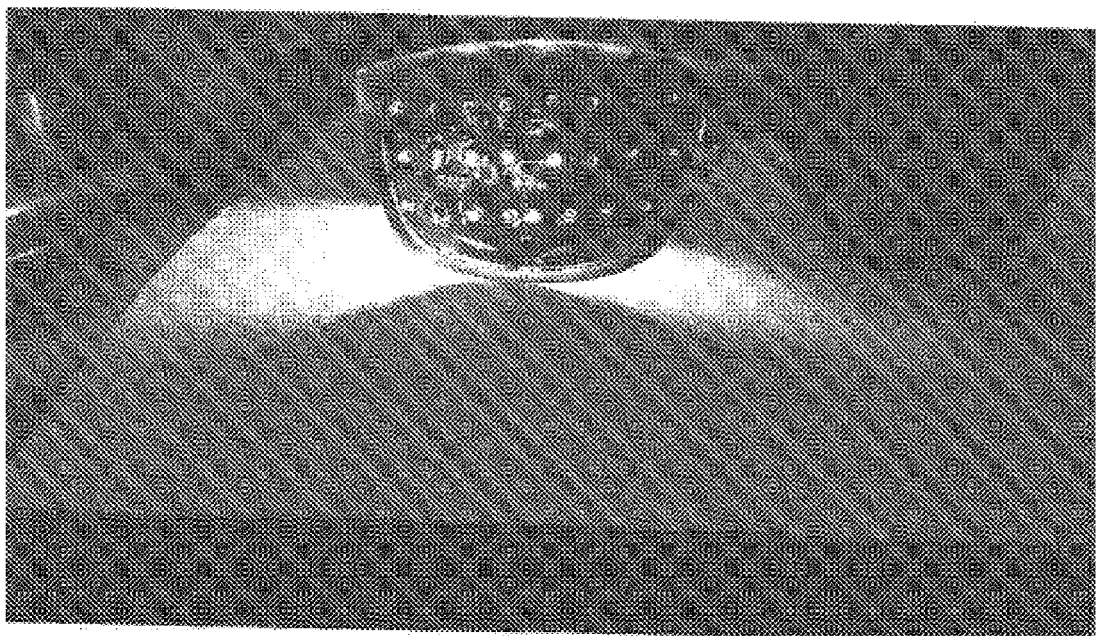
F I G. 19

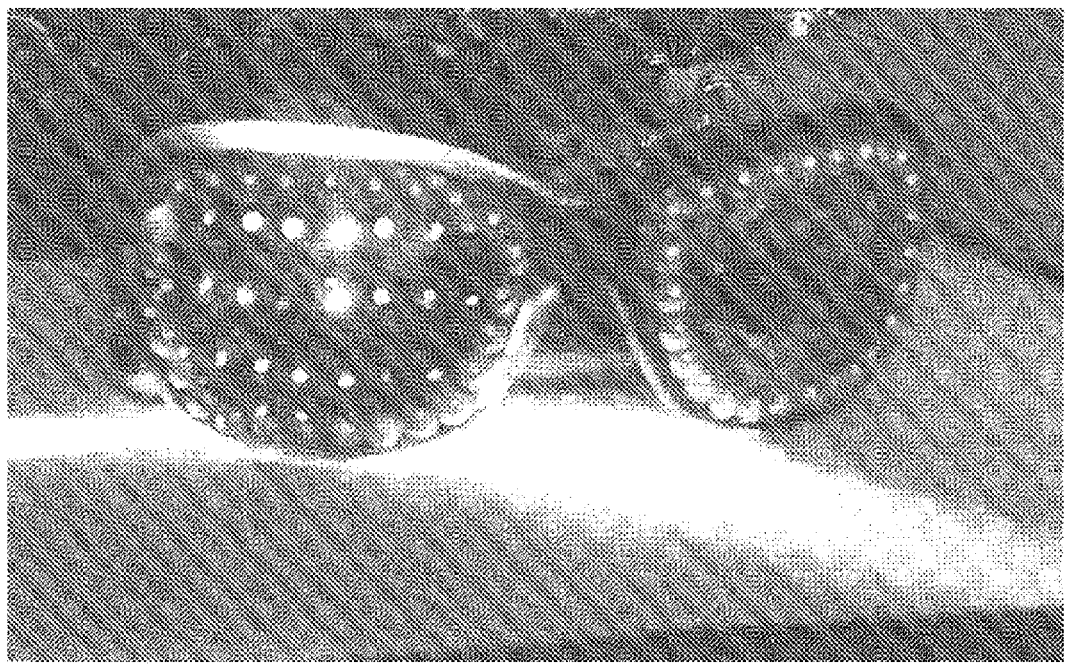
F I G. 20

EYEGLASSES AND METHOD FOR IMPROVING EYESIGHT

CROSS-REFERENCE TO RELATED APPLICATIONS

The present application is a continuation-in-part application of and claims the priority benefit of U.S. Nonprovisional Patent Application Ser. No. 15/389,447, files on Dec. 23, 2016 and titled "True View: The Light at the End of the Tunnel to Natural Improvement of Sight," which is incorporated herein by reference in its entirety.

BACKGROUND OF THE INVENTION

Field of the Invention

The present invention generally relates to eyeglasses, devices, and methods for improving eyesight or vision. More specifically, one aspect of the present invention is eyeglasses having at least one lens with a plurality of holes for natural improvement of eyesight or vision. The holes may be of different sizes and shapes and may be randomly positioned throughout the lens, and the lens may be painted upon. The eyeglasses may also include a patch. Another aspect of the present invention is a method for natural improvement of eyesight or vision through the use of the eyeglasses of the present invention.

Description of the Related Art

Eyeglasses, devices, and methods for improving eyesight or vision are known in the art.

The Applicant is unaware of inventions or patents, taken either singly or in combination, which are seen to describe the present invention as claimed.

SUMMARY OF THE INVENTION

One embodiment of an aspect of the present invention is a pair of eyeglasses having at least one lens with a plurality of holes for natural improvement of eyesight or vision. The holes may be of different sizes and shapes and may be randomly positioned throughout the lens, and the lens may be painted upon. Another embodiment of this aspect is a pair of eyeglasses that has at least one lens with a plurality of holes and that also has a patch.

Another aspect of the present invention is a method for natural improvement of eyesight or vision through the use of the eyeglasses of the present invention.

BRIEF DESCRIPTION OF THE DRAWINGS

FIG. 19 is a front, elevational view of another embodiment of a pair of eyeglasses for natural improvement of eyesight according to the present invention, wherein the pair of eyeglasses has at least one lens with a plurality of holes;

FIG. 20 is a front, elevational view of another embodiment of a pair of eyeglasses for natural improvement of eyesight according to the present invention, wherein the pair of eyeglasses has at least one lens with a plurality of holes;

Figure 1:
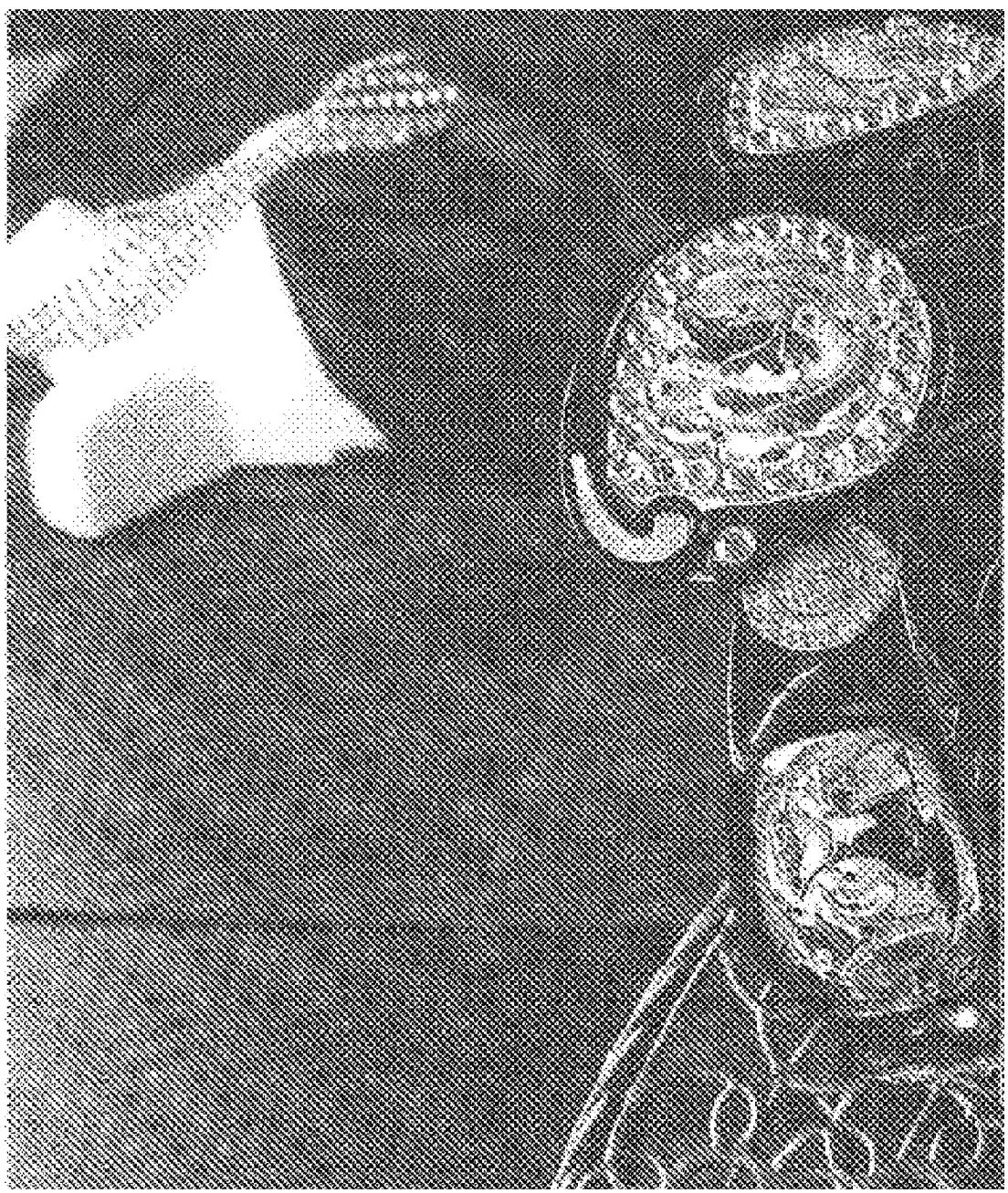
FIG. 1 is a front, elevational view of an embodiment of more than one pair of eyeglasses for natural improvement of eyesight according to the present invention, wherein each pair of eyeglasses has at least one lens with a plurality of holes.
Figure 2:
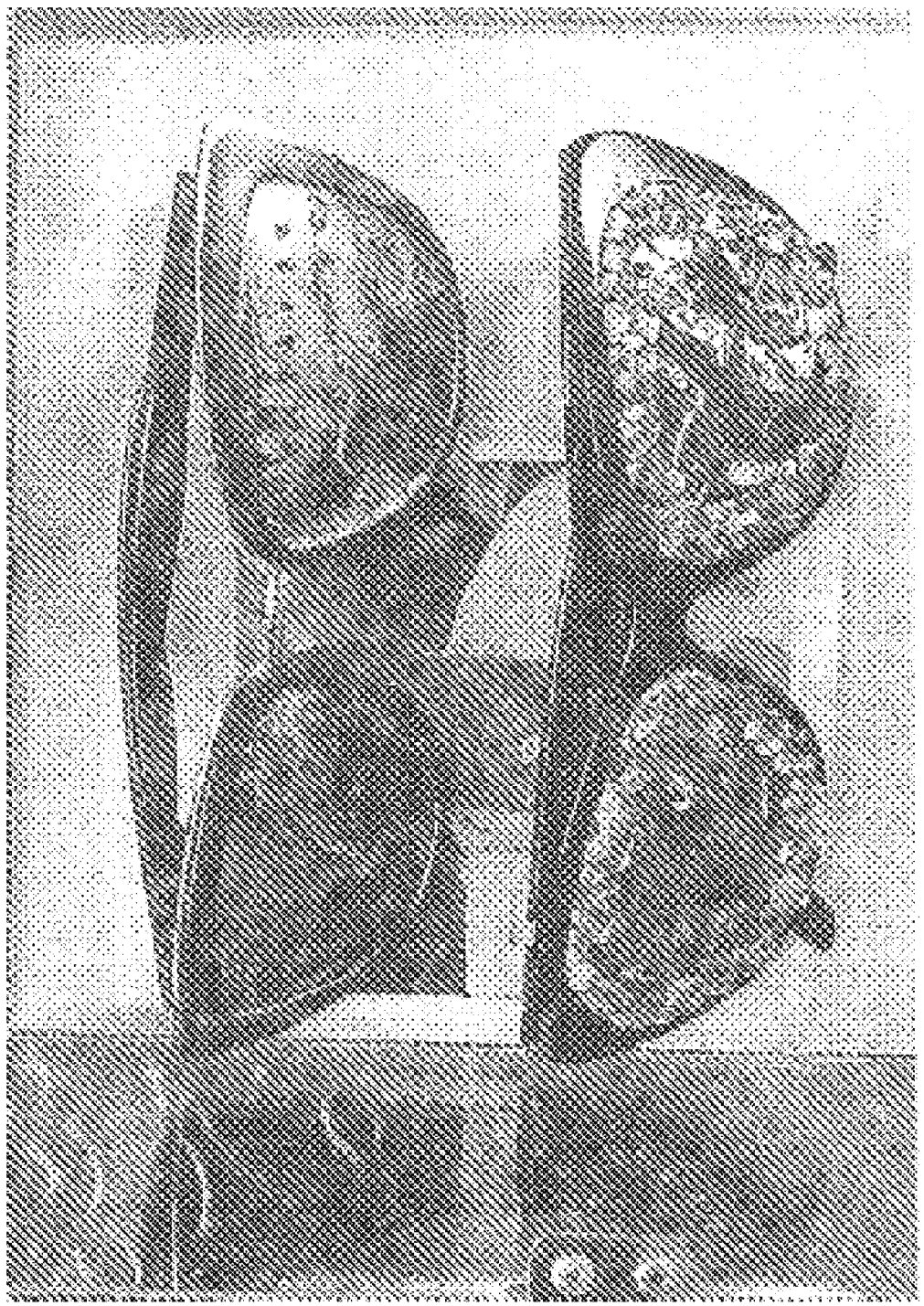
FIG. 2 is a front, elevational view of another embodiment of more than one pair of eyeglasses for natural improvement of eyesight according to the present invention, wherein each pair of eyeglasses has at least one lens with a plurality of holes.
Figure 3:
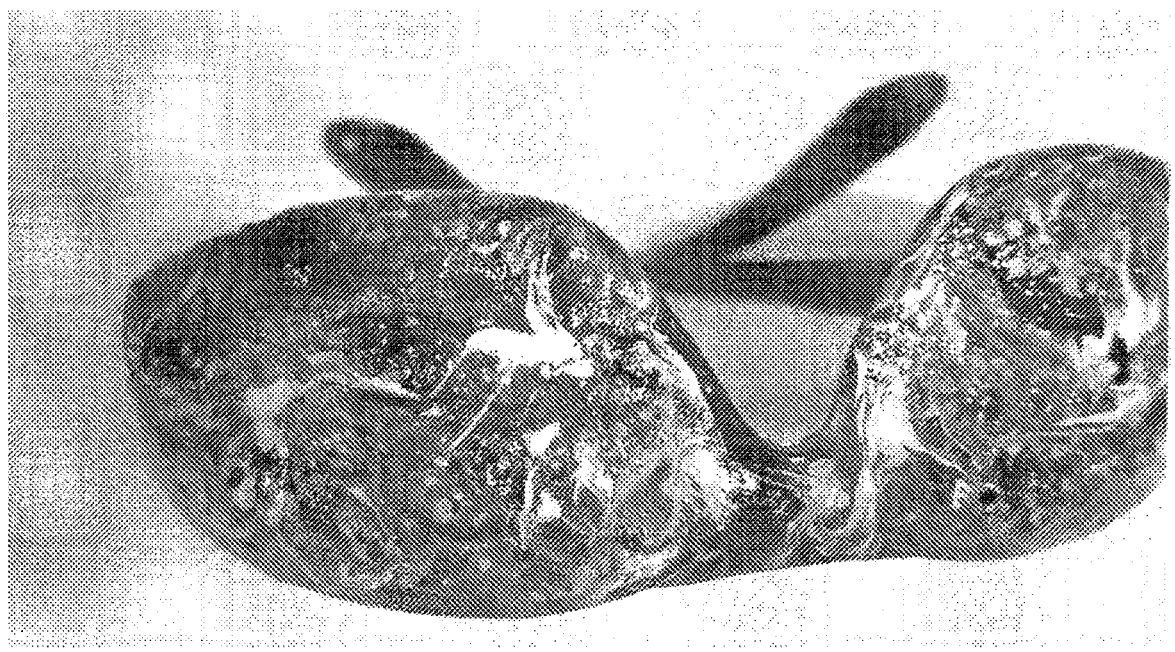
FIG. 3 is a front, elevational view of an embodiment of a pair of eyeglasses for natural improvement of eyesight according to the present invention, wherein the pair of eyeglasses has at least one lens with a plurality of holes.
Figure 4:
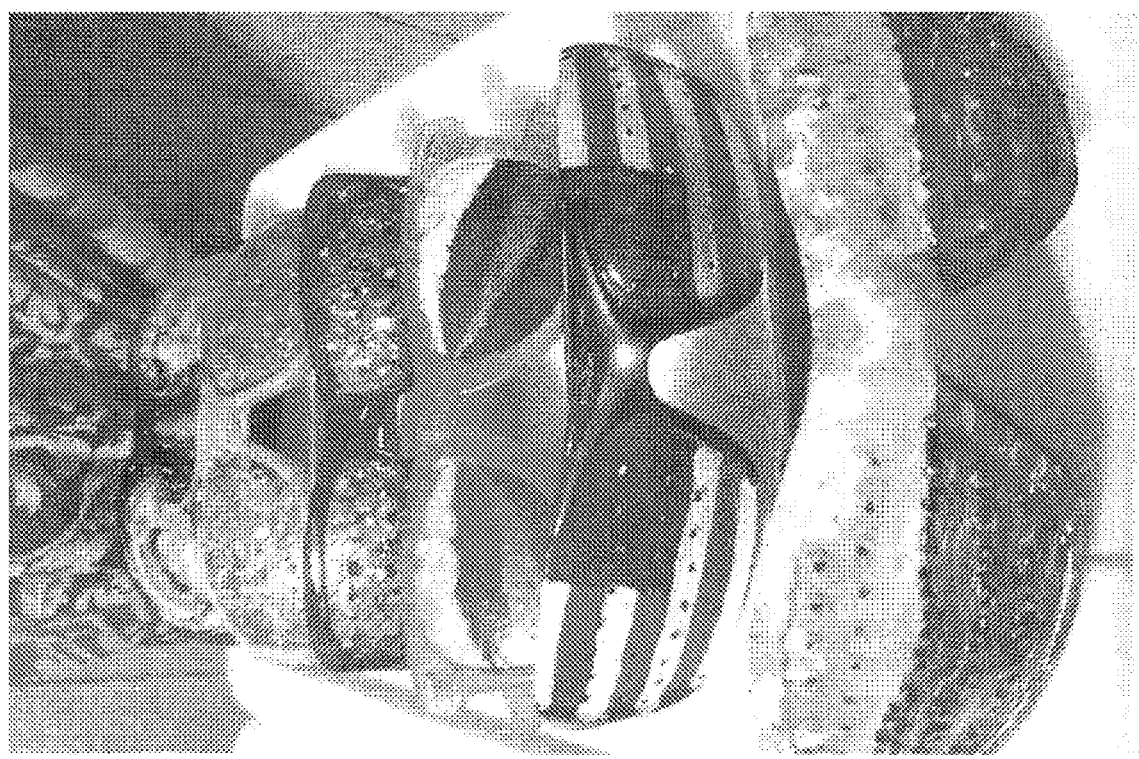
FIG. 4 is a front, elevational view of another embodiment of more than one pair of eyeglasses for natural improvement of eyesight according to the present invention, wherein each pair of eyeglasses has at least one lens with a plurality of holes.
Figure 5:
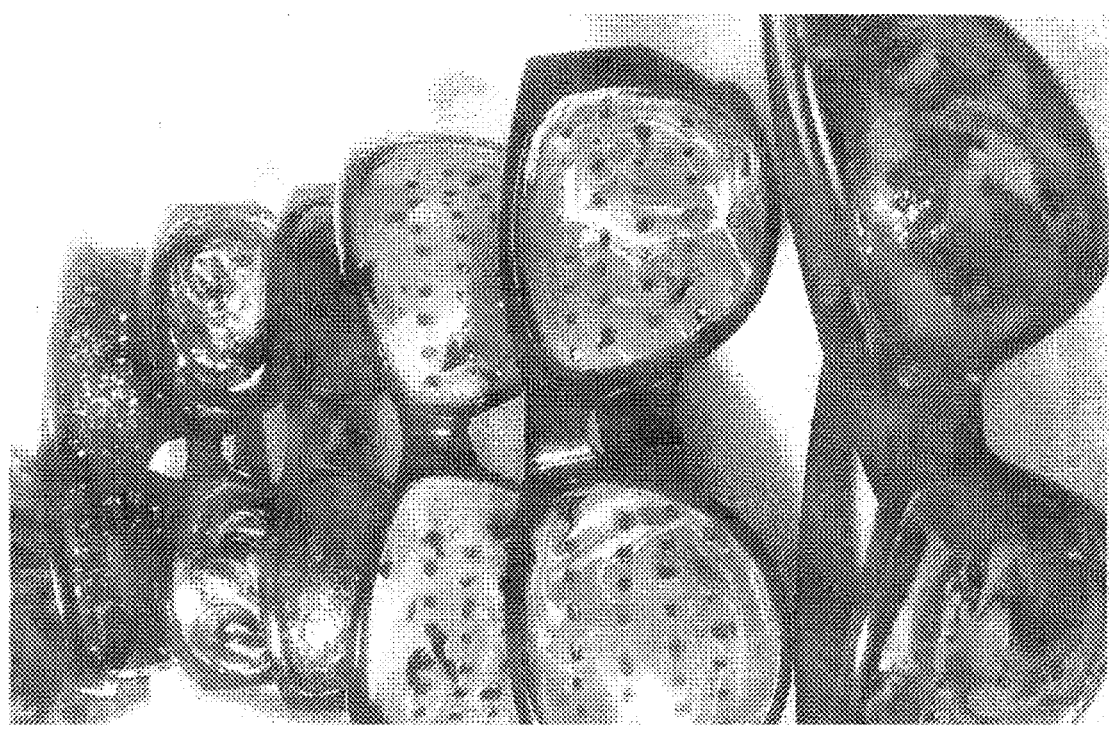
FIG. 5 is a front, elevational view of another embodiment of more than one pair of eyeglasses for natural improvement of eyesight according to the present invention, wherein each pair of eyeglasses has at least one lens with a plurality of holes.
Figure 6:
FIG. 6 is a front, elevational view of another embodiment of more than one pair of eyeglasses for natural improvement of eyesight according to the present invention, wherein each pair of eyeglasses has at least one lens with a plurality of holes.
Figure 7:
FIG. 7 is a front, elevational view of another embodiment of more than one pair of eyeglasses for natural improvement of eyesight according to the present invention, wherein each pair of eyeglasses has at least one lens with a plurality of holes.
Figure 8:
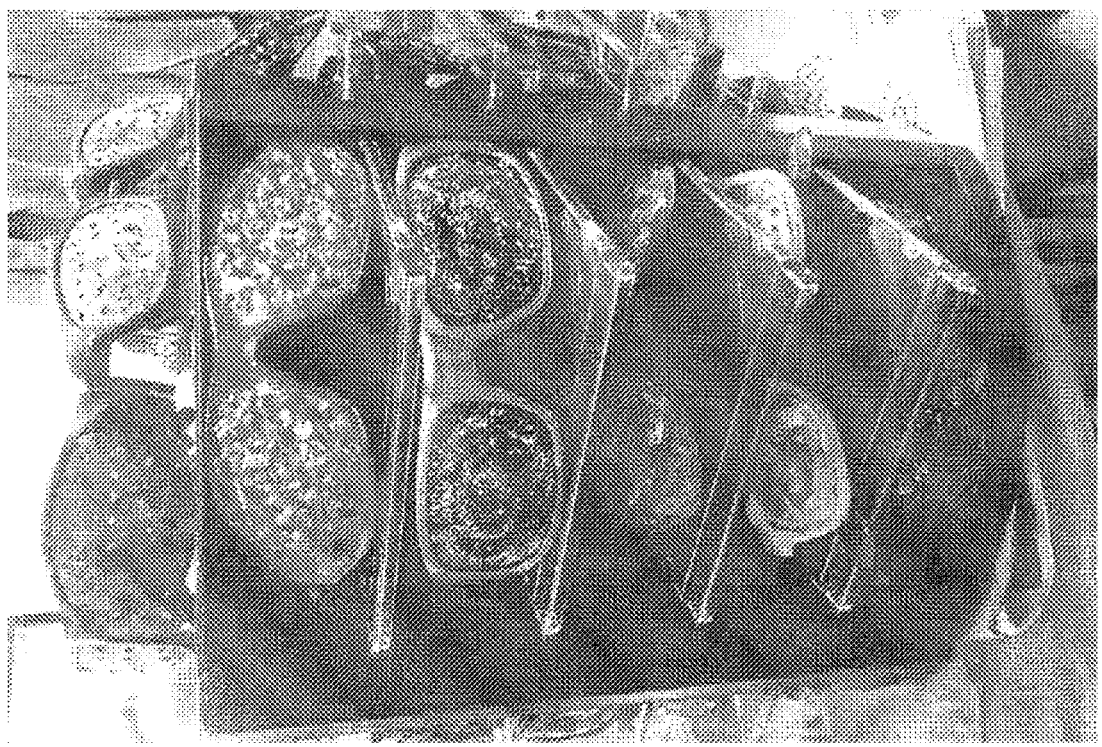
FIG. 8 is a front, elevational view of another embodiment of more than one pair of eyeglasses for natural improvement of eyesight according to the present invention, wherein each pair of eyeglasses has at least one lens with a plurality of holes.
Figure 9:
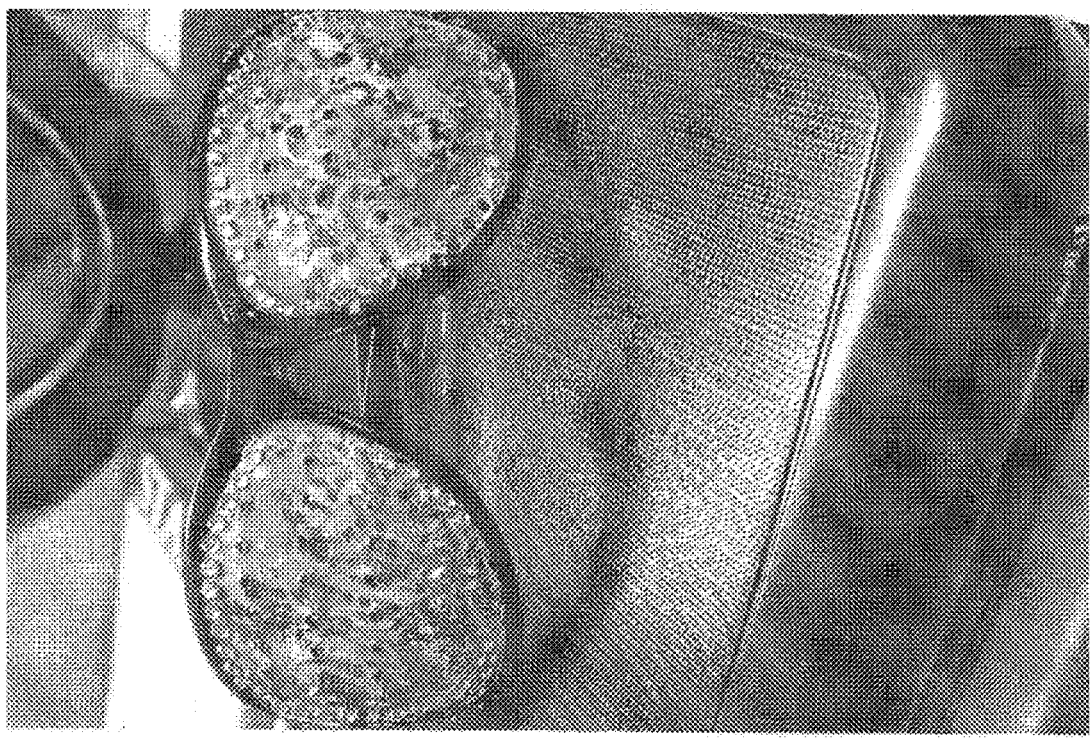
FIG. 9 is a front, elevational view of another embodiment of a pair of eyeglasses for natural improvement of eyesight according to the present invention, wherein the pair of eyeglasses has at least one lens with a plurality of holes.
Figure 10:
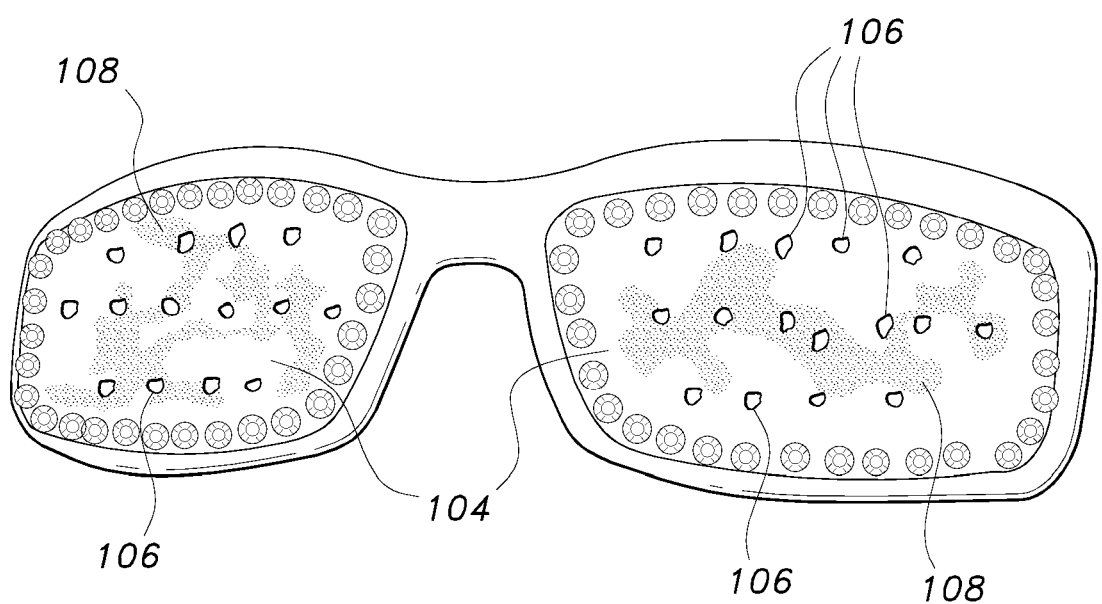
FIG. 10 is a front, elevational view of another embodiment of a pair of eyeglasses for natural improvement of eyesight according to the present invention, wherein the pair of eyeglasses has at least one lens with a plurality of holes.
Figure 11:
FIG. 11 is a front, elevational view of another embodiment of more than one pair of eyeglasses for natural improvement of eyesight according to the present invention, wherein the pair of eyeglasses has at least one lens with a plurality of holes.
Figure 12:
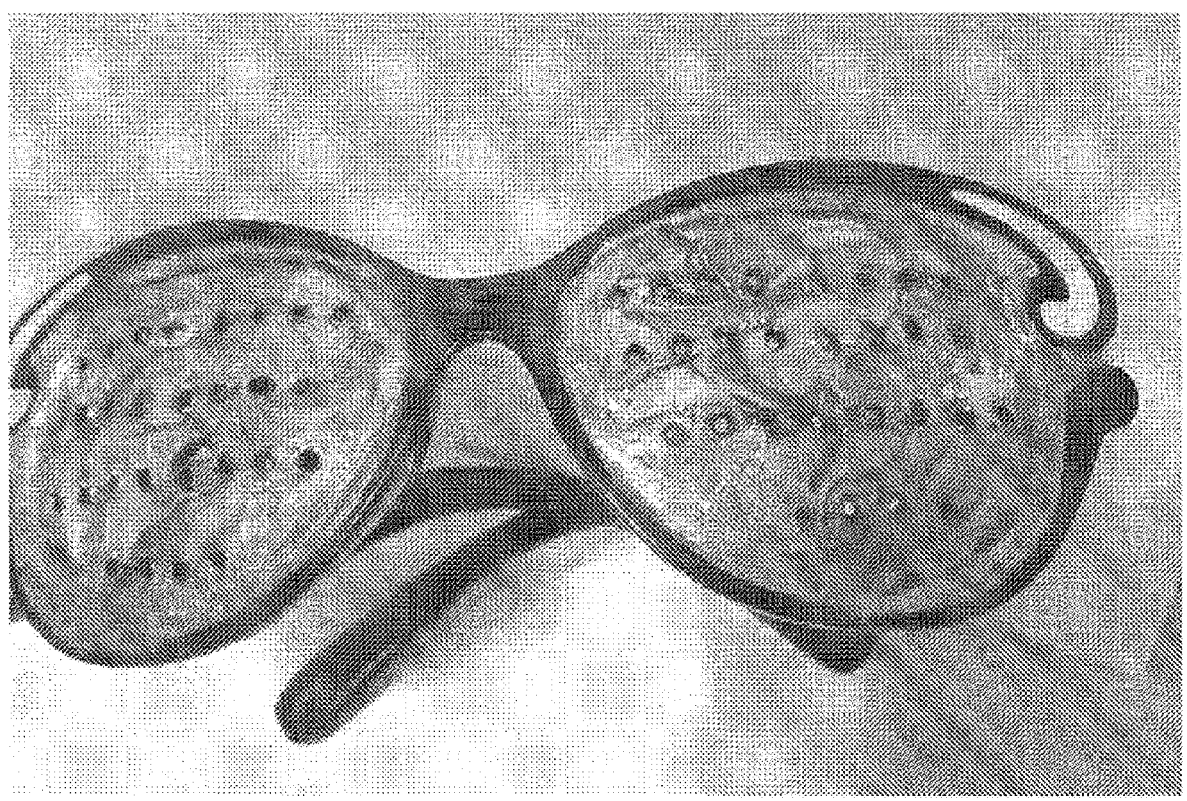
FIG. 12 is a front, elevational view of another embodiment of a pair of eyeglasses for natural improvement of eyesight according to the present invention, wherein the pair of eyeglasses has at least one lens with a plurality of holes.
Figure 13:
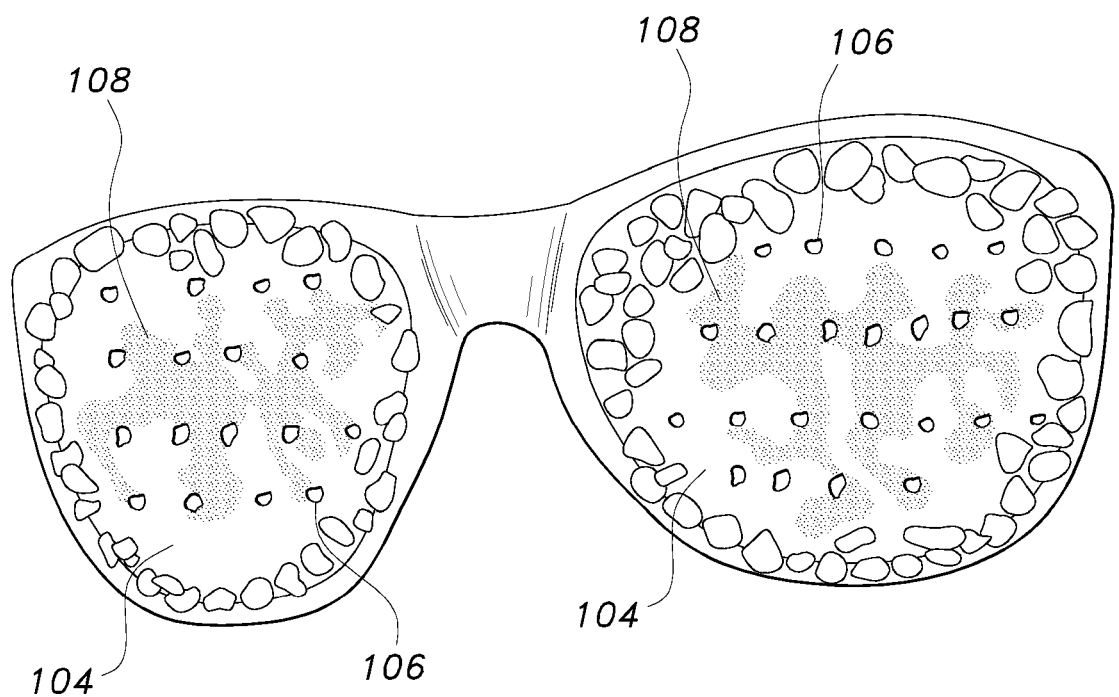
FIG. 13 is a front, elevational view of another embodiment of a pair of eyeglasses for natural improvement of eyesight according to the present invention, wherein the pair of eyeglasses has at least one lens with a plurality of holes.
Figure 14:
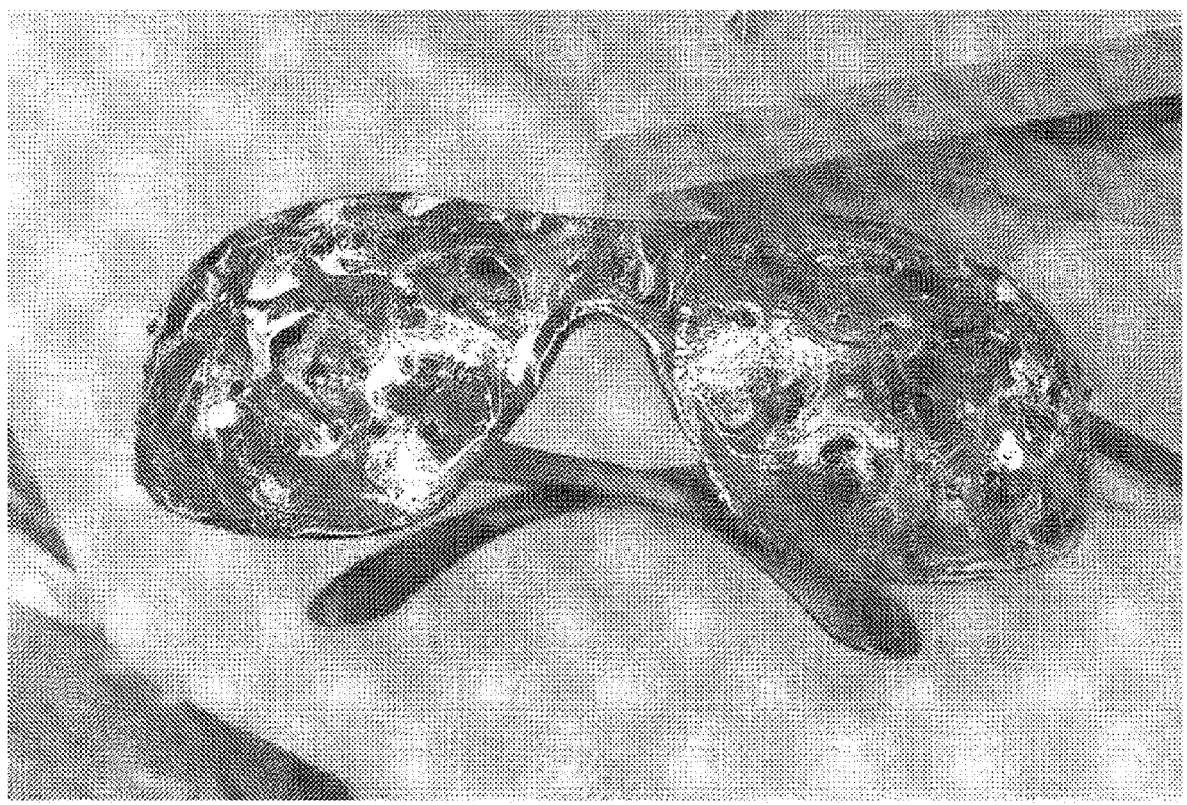
FIG. 14 is a front, elevational view of another embodiment of a pair of eyeglasses for natural improvement of eyesight according to the present invention, wherein the pair of eyeglasses has at least one lens with a plurality of holes.
Figure 15:
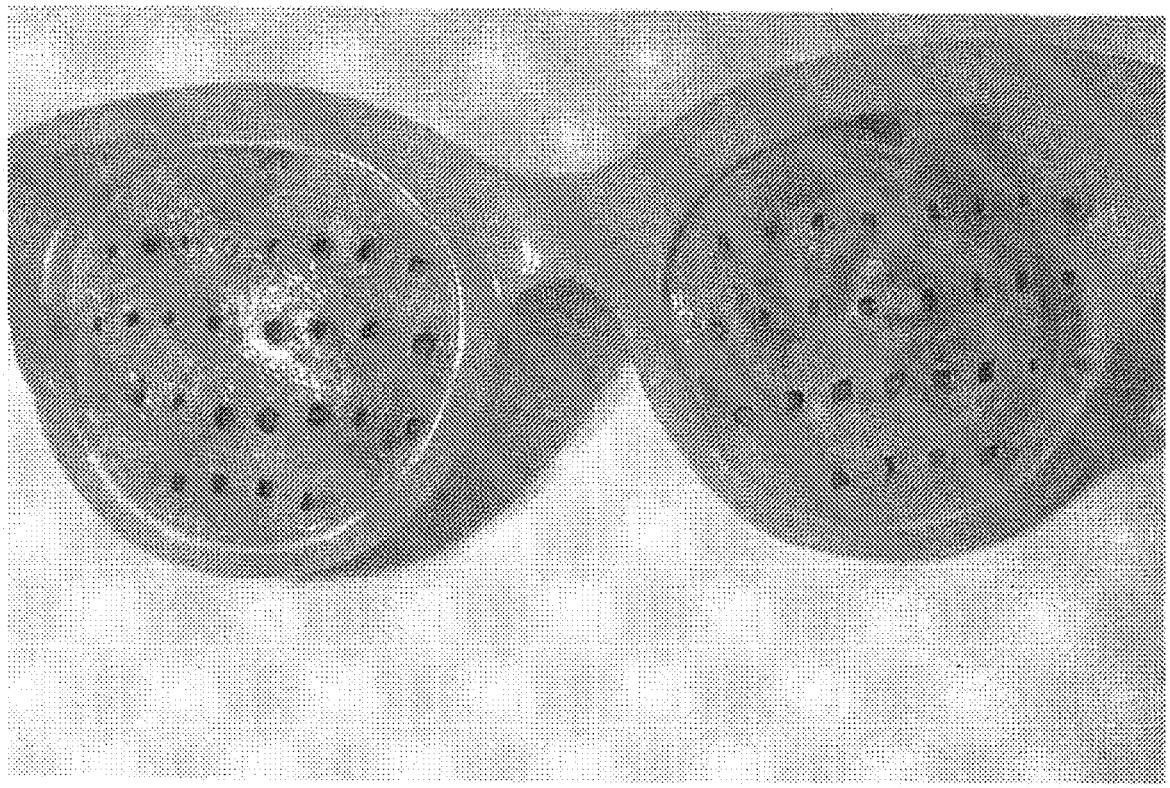
FIG. 15 is a front, elevational view of another embodiment of a pair of eyeglasses for natural improvement of eyesight according to the present invention, wherein the pair of eyeglasses has at least one lens with a plurality of holes.
Figure 16:
FIG. 16 is a front, elevational view of another embodiment of a pair of eyeglasses for natural improvement of eyesight according to the present invention, wherein the pair of eyeglasses has at least one lens with a plurality of holes.
Figure 17:
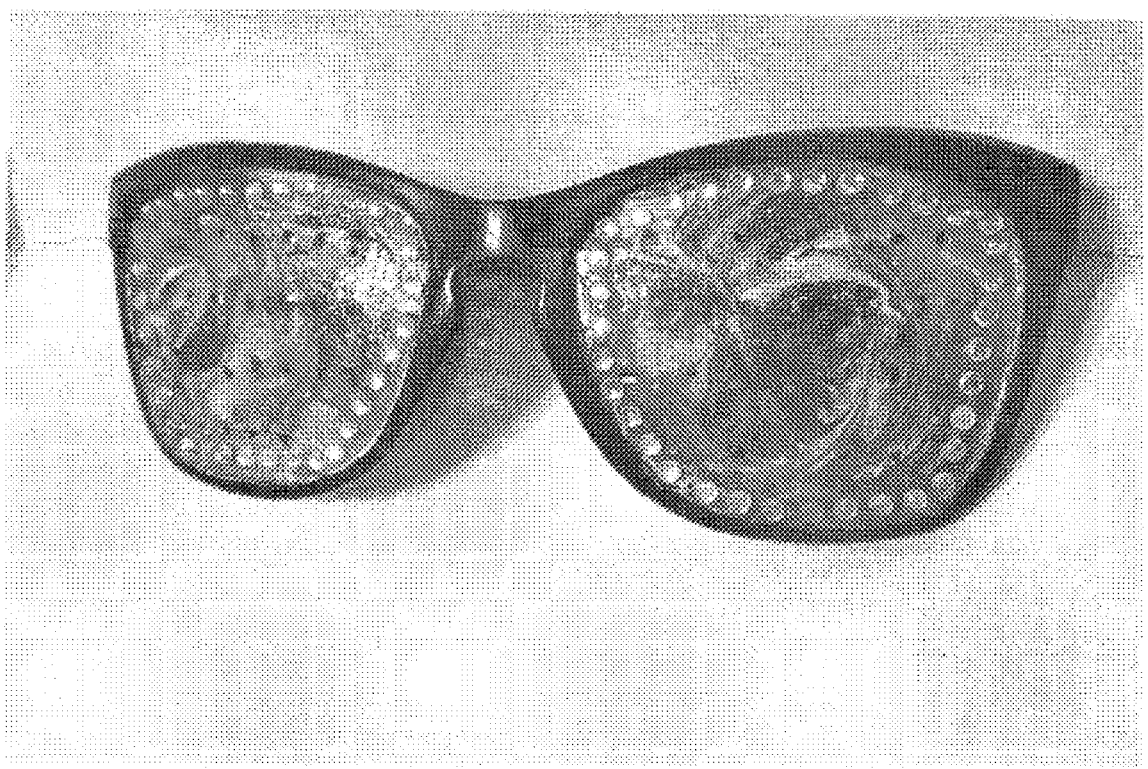
FIG. 17 is a front, elevational view of another embodiment of a pair of eyeglasses for natural improvement of eyesight according to the present invention, wherein the pair of eyeglasses has at least one lens with a plurality of holes.
Figure 18:
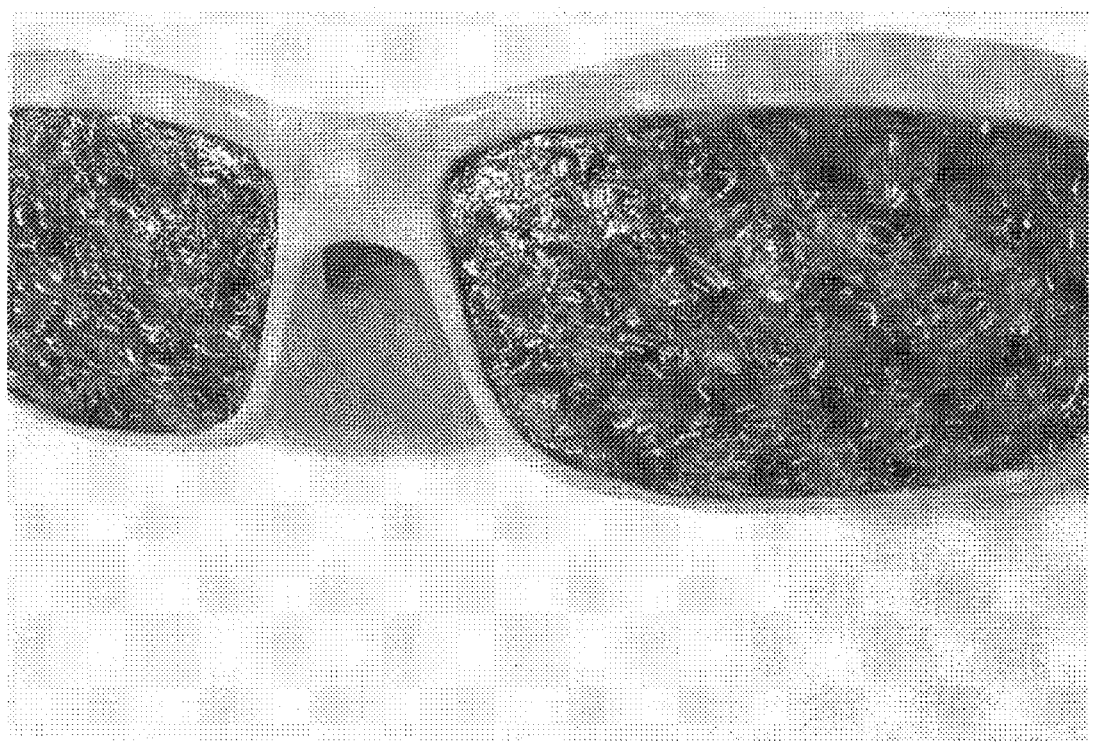
FIG. 18 is a front, elevational view of another embodiment of a pair of eyeglasses for natural improvement of eyesight according to the present invention, wherein the pair of eyeglasses has at least one lens with a plurality of holes.
Figure 21:
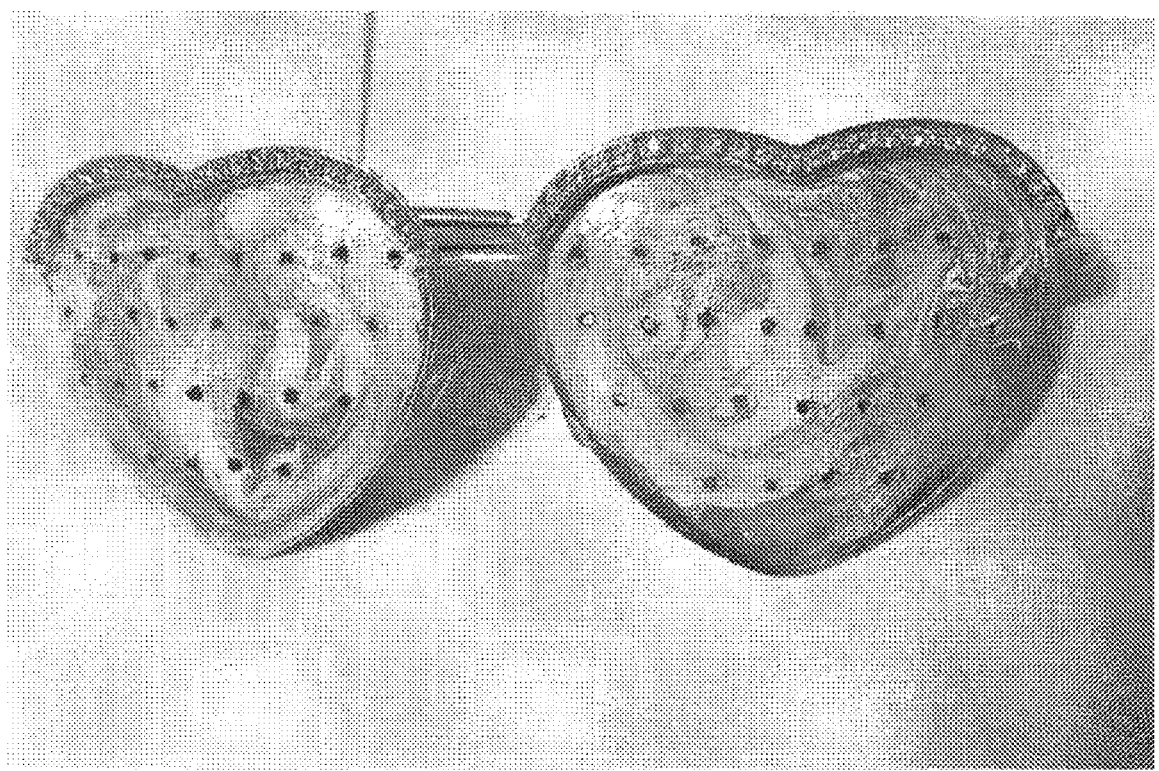
FIG. 21 is a front, elevational view of another embodiment of a pair of eyeglasses for natural improvement of eyesight according to the present invention, wherein the pair of eyeglasses has at least one lens with a plurality of holes.
Figure 22:
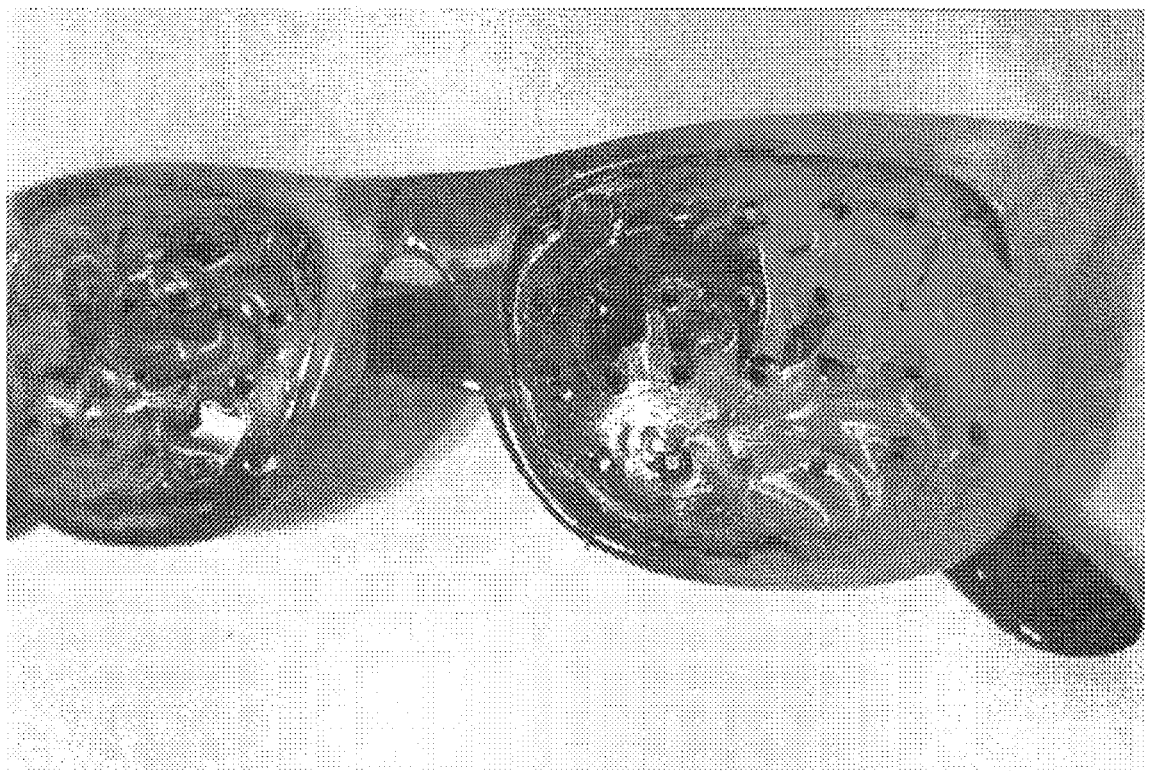
FIG. 22 is a front, elevational view of another embodiment of a pair of eyeglasses for natural improvement of eyesight according to the present invention, wherein the pair of eyeglasses has at least one lens with a plurality of holes.
Figure 23:
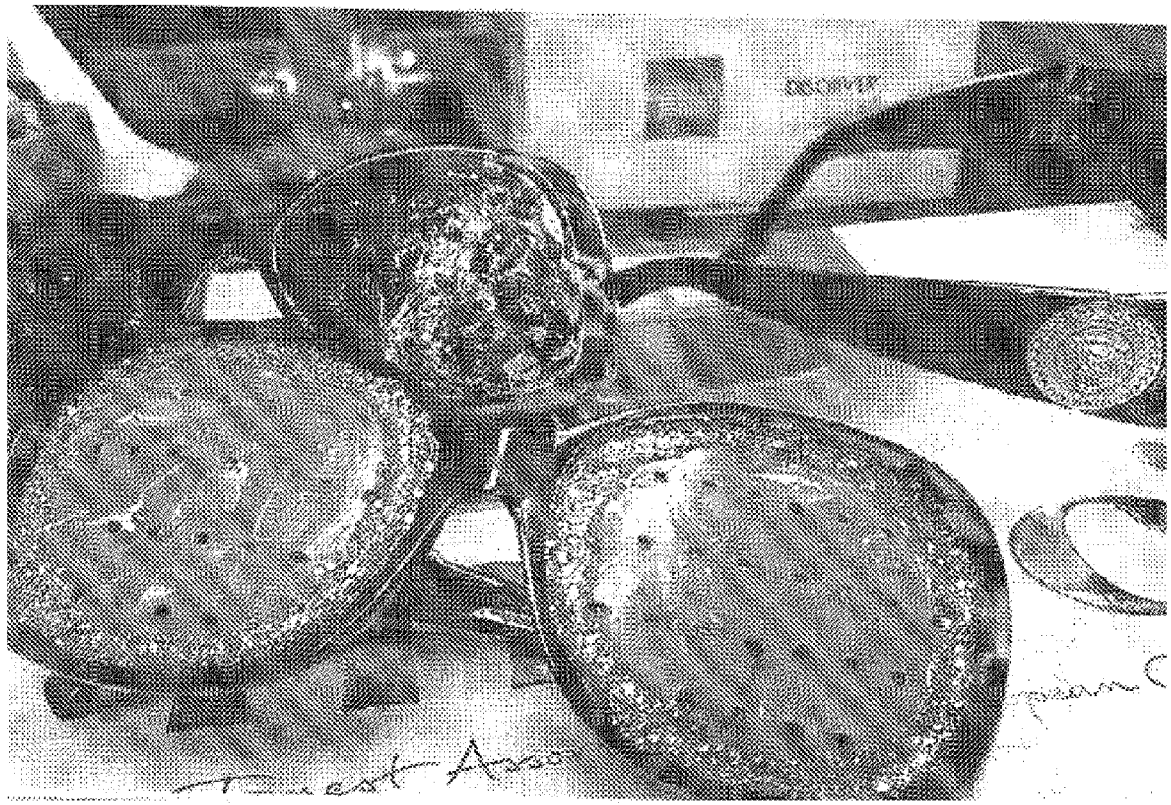
FIG. 23 is a front, elevational view of another embodiment of more than one pair of eyeglasses for natural improvement of eyesight according to the present invention, wherein each pair of eyeglasses has at least one lens with a plurality of holes.
Figure 24:
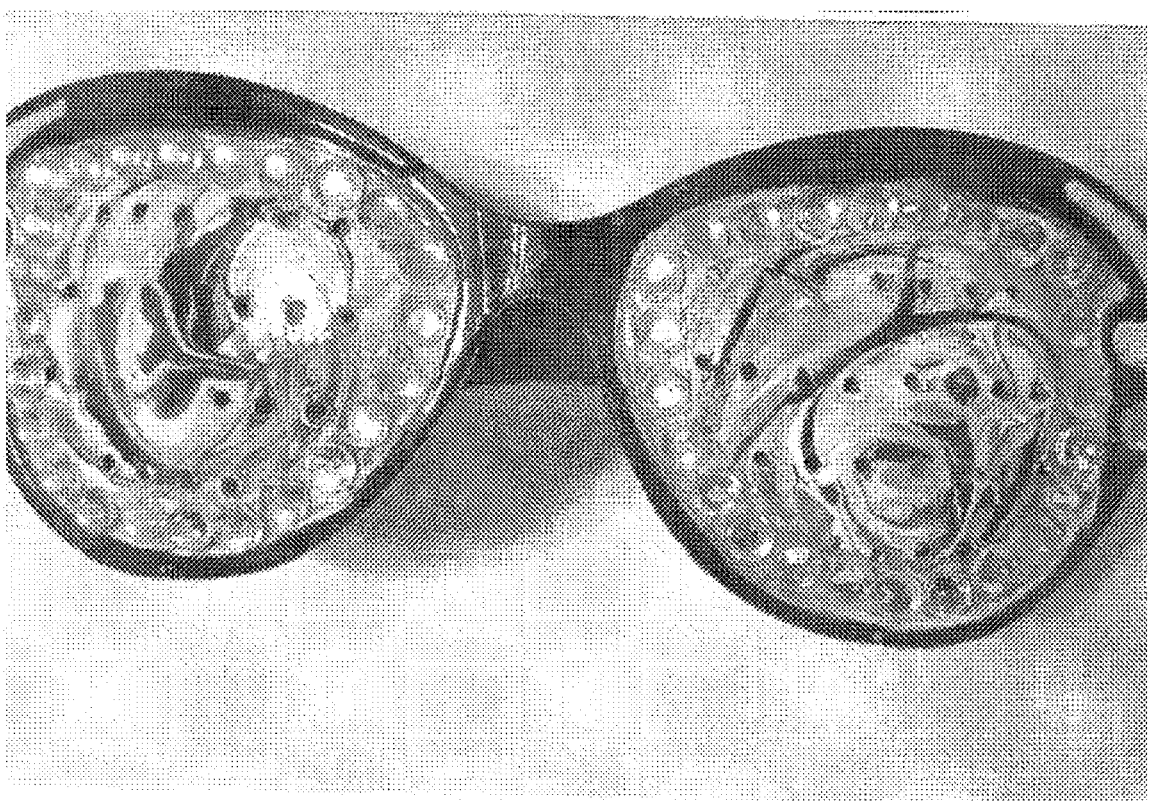
FIG. 24 is a front, elevational view of another embodiment of a pair of eyeglasses for natural improvement of eyesight according to the present invention, wherein the pair of eyeglasses has at least one lens with a plurality of holes.

It should be understood that the above-attached figures are not intended to limit the scope of the present invention in any way.

DETAILED DESCRIPTION OF THE INVENTION

Referring to FIGS. 1-28, one aspect of the present invention is eyeglasses having at least one lens 104 with a plurality of holes 106 for natural improvement of eyesight or vision. The eyeglasses 100 may improve a user's eyesight or vision after use during a certain amount of time while exuding fashionable looks. The eyeglasses 100 has a plurality of pinholes or holes 106 which exercises the muscles about the eyes and strengthens the eyes over time without the use of prescription glasses.

The eyeglasses 100 are designed with customers and users in mind, where possibly no two are the same when painted. The eyeglasses 100 may be made or manufactured with different styles, shapes and colors, with variations and sizes of holes, and with different frames 102, colors and styles, and with different scenery and pictures painted on the lenses 104 of the eyeglasses 100. Some examples of the sizes of different holes 106 are (1) 1.0 mm, (2) 1.2 mm, (3) 1.4 mm, (4) 1.8 mm, (5) 2.4 mm, and (6) 3.0 mm.

Also, the holes 106 may be of different shapes, and may be randomly positioned throughout the lens 104.

Further, the holes 106 give the user of the eyeglasses 100 choices of clarity to focus, making it easier for the user's eyes. Paintings 108 and designs give the user choices of what eyeglasses 100 the user likes, where possibly no two are the same. The eyeglasses 100 may be made or manufactured of different styles, colors and shapes; made to the user's desire as well as different frames 102 to choose from.

But most of all, the eyeglasses 100 will improve the user's eyesight or vision. As one case example, the Applicant was told by the Applicant's optometrist on about the Applicant's third visit that the Applicant's eyes have improved. Actually, the Applicant's optometrist didn't have to tell the Applicant about the Applicant's eyesight or vision improvement from using the eyeglasses 100 because the Applicant already knew this. At night time, the Applicant has been able to see more and more.

After the Applicant used the eyeglasses 100 herself, the Applicant's eyesight or vision has improved drastically. Previously, the Applicant was required to wear prescription glasses for everything, throughout the day and night. Now, the Applicant does not require prescription glasses at all during the day and have even seen improvements to the Applicant's night vision. The Applicant was unable to read license plates on vehicles in front of her before using these eyeglasses 100. Now, the Applicant is able to read all license plates during the day. Lastly, over the last four years, the Applicant's optometrist has tested the Applicant's vision and has seen remarkable improvement.

As one non-limiting example, the eyeglasses 100 may contain three different sizes of pinholes 106 in which the user's eyes are able to navigate to the hole size that things are most visible to start. As the user progresses and the user's eye muscles strengthen, the user is able to choose a smaller size hole 106, randomly placed, to then continue the strengthening of the eyes. The desired end result is where prescription glasses may never be necessary again.

The eyeglasses 100 may be custom made and one of a kind, and designed with the customer's or user's requested color(s) and design in mind. The paintings 108 on the eyeglasses 100 may be handcrafted and never duplicated.

Figure 25:
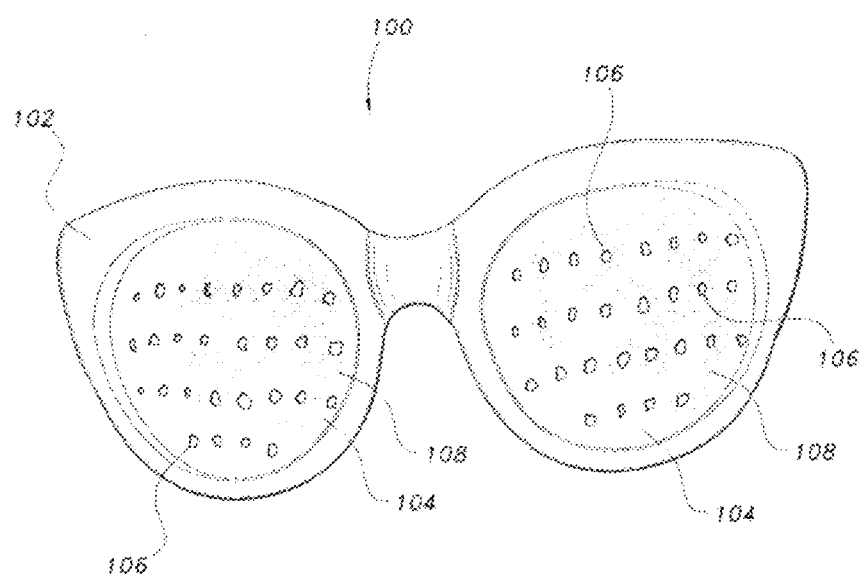
FIG. 25 is a front, elevational view of another embodiment of a pair of eyeglasses for natural improvement of eyesight according to the present invention, wherein the pair of eyeglasses has at least one lens with a plurality of holes.
Figure 26:
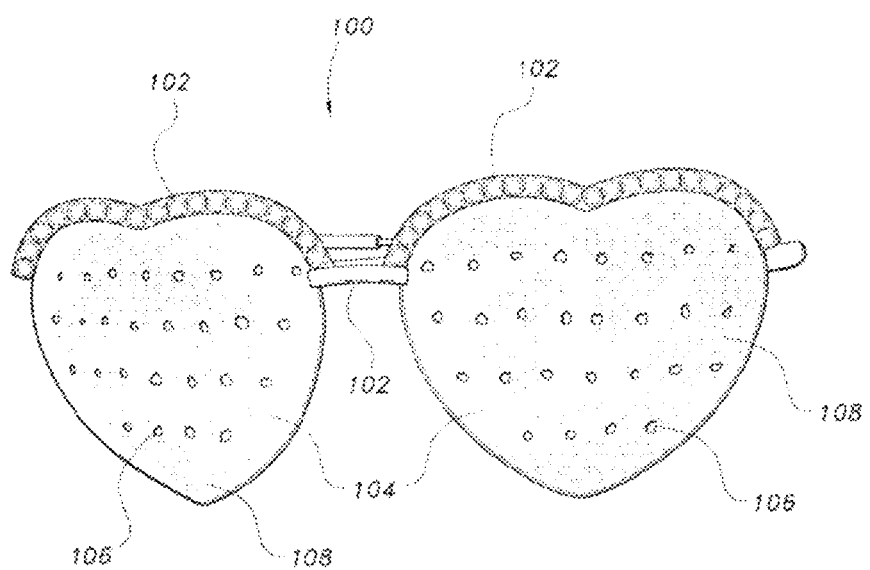
FIG. 26 is a front, elevational view of another embodiment of a pair of eyeglasses for natural improvement of eyesight according to the present invention, wherein the pair of eyeglasses has at least one lens with a plurality of holes.

As shown in FIGS. 25 and 26, the plurality of holes 106 are in different sizes and shapes and are positioned in rows on the lenses 104, which include a design 108 painted on the lenses 104.

Figure 27:
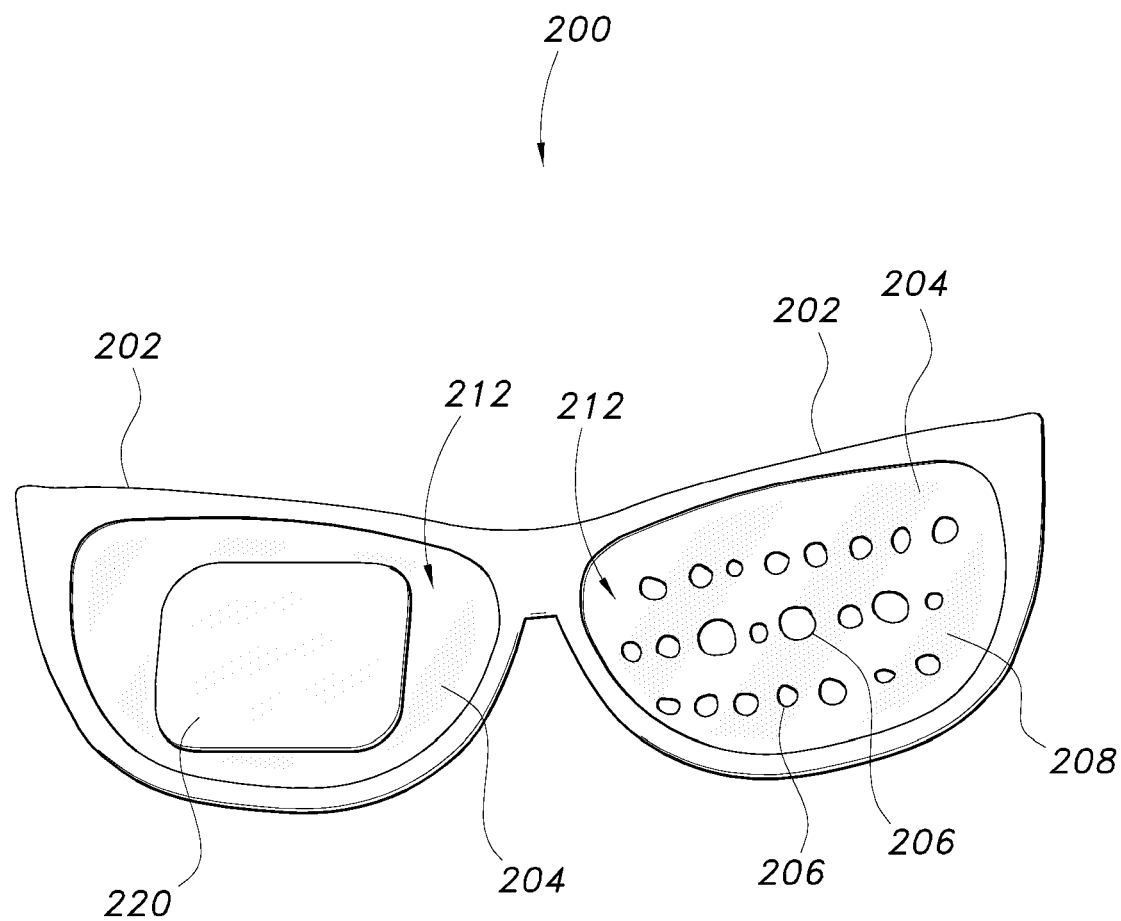
FIG. 27 is a front, elevational view of another embodiment of a pair of eyeglasses for natural improvement of eyesight according to the present invention, wherein the pair of eyeglasses has a patch and at least one lens with a plurality of holes; and wherein the patch is secured or attached on a rear side of one of the lens.
Figure 28:
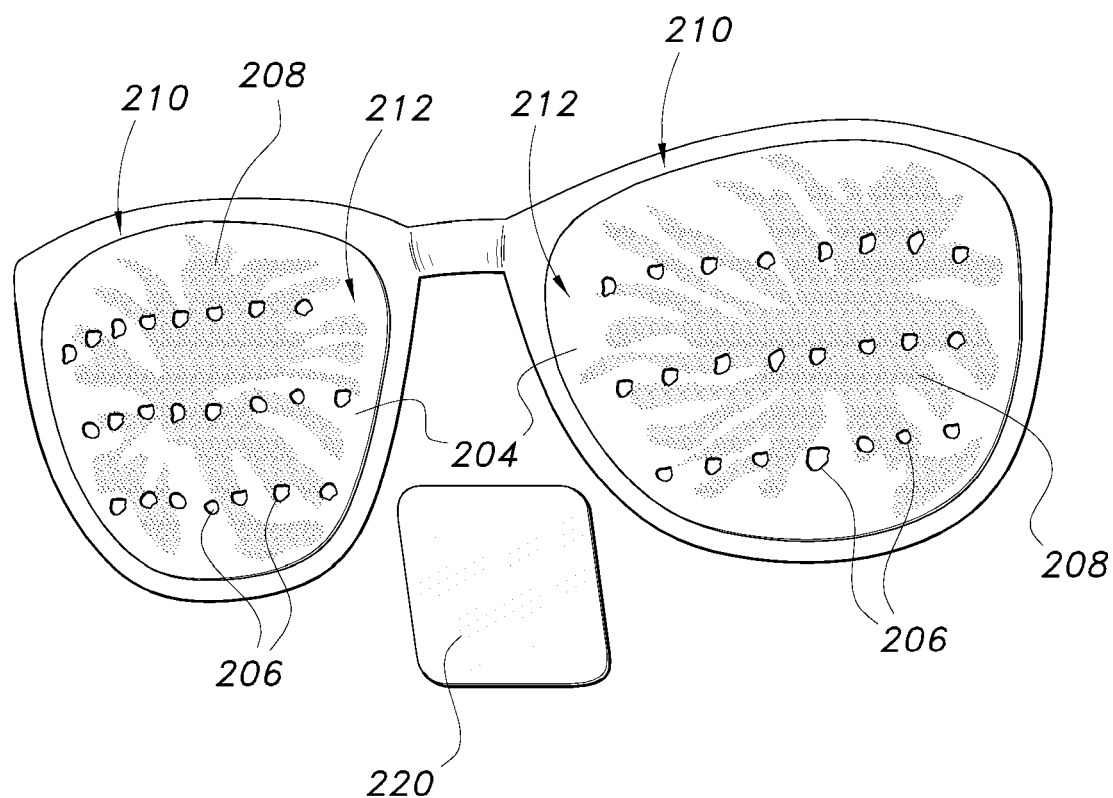
FIG. 28 is a front, elevational view of the pair of eyeglasses of FIG. 27, wherein the patch is unsecured or unattached from the rear side of one of the lens.

As shown in FIG. 27 and as another embodiment of eyeglasses for natural improvement of eyesight or vision, a pair of eyeglasses 200 has at least one lens 204 with a plurality of holes 206 and also has a patch 220.

The patch 220 is preferably secured or attached on a rear side 210 of one of the lens 204. Alternatively, the patch 220 may be secured or attached on a front side 212 of one of the lens 204. The patch 220 may be secured or attached on the rear side 210 (or, alternatively, the front side 212) of one of the lens 204 by a clip or any device or method known to one of ordinary skill in the art. It is believed that use of the patch 220 helps to strengthen the user's weak eye, which is opposite the eye covered by the patch 220, during use by making the weak eye work by itself to be able to see objects (such as, but not limited to, things, people and/or animals). It is believed that this process will force the muscles in the weak eye to work more or harder.

Preferably, other than the patch 220 and patch-securing or patch-attaching device or method, each of the lenses 204, holes 206, paintings 208, and any other component and/or limitation of eyeglasses 200 is similar or substantially similar to or exactly the same as the lenses 104, holes 106, paintings 108, and any other component and/or limitation of eyeglasses 100, respectively.

Another aspect of the present invention is a method for natural improvement of eyesight or vision through the use of the eyeglasses 100,200 of the present invention. The method comprises the step of providing a user with eyeglasses 100,200 for use by the user to improve the user's eyesight or vision.

It is to be understood that the present invention is not limited to the embodiments and non-limiting examples described above or as shown in the attached figures, but encompasses any and all embodiments within the spirit of the invention.

What is claimed is:

1. A method for natural improvement of eyesight or vision of a user through the use of eyeglasses, the method comprising the step of:
    providing said eyeglasses comprising a lens to the user,
    wherein said eyeglasses help to exercise muscles about at least one eye of the user,
    wherein said lens comprises a plurality of holes of at least two different sizes in width, each of said at least two different sizes is between and including 1 millimeter (0.0393701 inch) to 3 millimeters (0.11811 inch) in width,
    wherein all holes of said lens are arranged in a plurality of rows, and all holes of said lens are randomly arranged in terms of the different sizes of width of each hole.

2. A method for natural improvement of eyesight or vision of a user through the use of eyeglasses, the method comprising the step of:
    providing said eyeglasses comprising a lens to the user,
    wherein said eyeglasses help to exercise muscles about at least one eye of the user,
    wherein said lens comprises a plurality of holes of at least two different sizes in width, each of said at least two different sizes is between and including 1 millimeter (0.0393701 inch) to 3 millimeters (0.11811 inch) in width,
    wherein all holes of said lens are positioned randomly throughout said lens, and all holes of said lens are randomly arranged in terms of the different sizes of width of each hole.

3. Eyeglasses for natural improvement of eyesight or vision of a user, said eyeglasses comprising:
    a lens comprises a plurality of holes of at least two different sizes in width,
    wherein each of said at least two different sizes is between and including 1 millimeter (0.0393701 inch) to 3 millimeters (0.11811 inch) in width,
    wherein said eyeglasses help to exercise muscles about at least one eye of the user,
    wherein all holes of said lens are either arranged in a plurality of rows or positioned randomly throughout said lens and all holes of said lens are randomly arranged in terms of the different sizes of width of each hole.

4. The eyeglasses according to claim 3, wherein said plurality of holes have a plurality of different shapes.

5. The eyeglasses according to claim 3, wherein said each of said at least two different sizes is selected from the group consisting of about 1.0 mm (0.0393701 inch), about 1.2 mm (0.0472441 inch), about 1.4 mm (0.0551181 inch), about 1.8 mm (0.0708661 inch), about 2.4 mm (0.0944882 inch), and about 3.0 mm (0.11811 inch) in width.

6. The eyeglasses according to claim 3, wherein said plurality of holes are arranged in a plurality of rows.

7. The eyeglasses according to claim 3, wherein said plurality of holes are arranged randomly.

8. The eyeglasses according to claim 3, wherein said plurality of holes are of three different sizes in width.

9. The eyeglasses according to claim 3 wherein said eyeglasses further comprise a second lens, said second lens comprises a patch.

10. The method according to claim 1, wherein said plurality of holes are of a plurality of shapes.

11. The method according to claim 1, wherein each of said at least two different sizes is selected from the group consisting of about 1.0 mm (0.0393701 inch), about 1.2 mm (0.0472441 inch), about 1.4 mm (0.0551181 inch), about 1.8 mm (0.0708661 inch), about 2.4 mm (0.0944882 inch), and about 3.0 mm (0.11811 inch) in width.

12. The method according to claim 1, wherein said plurality of holes are of three different sizes in width.

13. The method according to claim 1 wherein said eyeglasses further comprise a second lens, said second lens comprises a patch.

14. The method according to claim 1, wherein said lens further comprises a design handpainted upon said lens.

15. The method according to claim 1, wherein said plurality of holes are of three different sizes in width, wherein said plurality of holes are arranged in a plurality of rows, and wherein said plurality of holes are of a plurality of shapes.

16. The method according to claim 2, wherein said plurality of holes are of a plurality of shapes.

17. The method according to claim 2, wherein each of said at least two different sizes is selected from the group consisting of about 1.0 mm (0.0393701 inch), about 1.2 mm (0.0472441 inch), about 1.4 mm (0.0551181 inch), about 1.8 mm (0.0708661 inch), about 2.4 mm (0.0944882 inch), and about 3.0 mm (0.11811 inch) in width.

18. The method according to claim 2, wherein said plurality of holes are of three different sizes in width.

19. The method according to claim 2, wherein said lens further comprises a design handpainted upon said lens.

20. The method according to claim 2 wherein said eyeglasses further comprise a second lens, said second lens comprises a patch.

21. The method according to claim 2, wherein said plurality of holes are of three different sizes in width, and wherein said plurality of holes are of a plurality of shapes.

22. The eyeglass according to claim 3, wherein said lens further comprises a design handpainted upon said lens.

\* \* \* \* \*